US012214572B2

United States Patent
Niimura et al.

(10) Patent No.: US 12,214,572 B2
(45) Date of Patent: Feb. 4, 2025

(54) MODIFIED VINYL ACETAL RESIN FOR INTERLAYER FILM OF LAMINATED GLASS

(71) Applicant: KURARAY CO., LTD., Kurashiki (JP)

(72) Inventors: Takuro Niimura, Tsukuba (JP); Akio Takasugi, Tsukuba (JP); Atsuhiro Nakahara, Tsukuba (JP); Yoshiaki Asanuma, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 116 days.

(21) Appl. No.: 17/440,815

(22) PCT Filed: Mar. 18, 2020

(86) PCT No.: PCT/JP2020/012096
§ 371 (c)(1),
(2) Date: Sep. 20, 2021

(87) PCT Pub. No.: WO2020/196186
PCT Pub. Date: Oct. 1, 2020

(65) Prior Publication Data
US 2022/0184930 A1    Jun. 16, 2022

(30) Foreign Application Priority Data

Mar. 28, 2019  (JP) ................................. 2019-064672
Jul. 12, 2019  (JP) ................................. 2019-130250

(51) Int. Cl.
*B32B 17/10*  (2006.01)
*C08F 8/28*  (2006.01)
(Continued)

(52) U.S. Cl.
CPC ........ *B32B 17/10761* (2013.01); *B32B 17/10* (2013.01); *B32B 17/10036* (2013.01);
(Continued)

(58) Field of Classification Search
CPC ........ B32B 17/10036; B32B 17/10761; B32B 2250/03; B32B 2307/306;
(Continued)

(56) References Cited

U.S. PATENT DOCUMENTS 4,212,956 A * 7/1980 Katsura ................... B32B 27/36
525/61
2017/0190151 A1* 7/2017 Hamano ........... B32B 17/10788
(Continued)

FOREIGN PATENT DOCUMENTS

EP    1384731 A1 *  1/2004  ....... B32B 17/10761
EP    2963496 A1 *  1/2016  ........... B41C 1/1008
(Continued)

OTHER PUBLICATIONS

Machine translation of JP-2014198767-A, retrieved Sep. 13, 2023. (Year: 2014).*
(Continued)

*Primary Examiner* — Callie E Shosho
*Assistant Examiner* — Krupa Shukla
(74) *Attorney, Agent, or Firm* — Element IP, PLC

(57) ABSTRACT

The problem to be solved of the present invention is to provide a modified vinyl acetal resin for an interlayer film of laminated glass having excellent transparency, impact resistance, heat resistance and molding ability. The means for solving the problem is a modified vinyl acetal resin for an interlayer film of laminated glass comprising 25 to 60 mol % of ethylene units and 24 to 71% by mol of vinyl alcohol units, based on all the monomer units constituting the resin, and having the acetalization degree of 5 mol % or more and less than 40 mol %.

6 Claims, 1 Drawing Sheet

(51) Int. Cl.
*C08F 210/02* (2006.01)
*C08F 216/06* (2006.01)
*C08F 216/38* (2006.01)
*C08J 5/18* (2006.01)

(52) U.S. Cl.
CPC .............. *C08F 8/28* (2013.01); *C08F 210/02* (2013.01); *C08F 216/06* (2013.01); *C08F 216/38* (2013.01); *C08J 5/18* (2013.01); *B32B 2250/03* (2013.01); *B32B 2307/306* (2013.01); *B32B 2307/412* (2013.01); *B32B 2307/558* (2013.01); *B32B 2605/006* (2013.01)

(58) Field of Classification Search
CPC ........ B32B 2307/412; B32B 2307/558; B32B 2605/006; B32B 17/10; C08F 210/02; C08F 216/06; C08F 216/38; C08F 8/28; C08J 2329/14; C08J 2329/04; C08L 29/14; C08L 29/04
See application file for complete search history.

(56) References Cited

U.S. PATENT DOCUMENTS

| | | | | |
|---|---|---|---|---|
| 2017/0253010 | A1* | 9/2017 | Lu | .......................... B32B 3/263 |
| 2023/0069427 | A1* | 3/2023 | Niimura | ..................... C08J 5/18 |

FOREIGN PATENT DOCUMENTS

| | | | | |
|---|---|---|---|---|
| JP | S63-79741 | A | | 4/1988 |
| JP | S6474201 | A | * | 3/1989 |
| JP | H09-30846 | A | | 2/1997 |
| JP | 2004068013 | A | | 3/2004 |
| JP | 2006028459 | A | * | 2/2006 |
| JP | 2008297345 | A | * | 12/2008 |
| JP | 2011057737 | A | * | 3/2011 |
| JP | 2013237727 | A | | 11/2013 |
| JP | 2014189681 | A | | 10/2014 |
| JP | 2014198767 | A | * | 10/2014 |

OTHER PUBLICATIONS

Machine translation of JP-2011057737-A, retrieved Sep. 13, 2023. (Year: 2011).*
Machine translation of JP-2008297345-A, retrieved Sep. 13, 2023. (Year: 2008).*
SigmaAldrich—Salicylaldehyde, retrieved Mar. 21, 2024. (Year: 2024).*
Machine translation of JPS6474201A, retrieved Mar. 21, 2024. (Year: 1989).*
Machine translation of JP-2006028459-A, retrieved Mar. 22, 2024. (Year: 2006).*
Extended European Search Report issued Nov. 17, 2022 in Patent Application No. 20777029.8, 7 pages.
International Preliminary Report on Patentability and Written Opinion issued Sep. 28, 2021 in PCT/JP2020/012096, 6 pages.
International Search Report issued Jun. 9, 2020 in PCT/JP2020/012096, 2 pages.

* cited by examiner

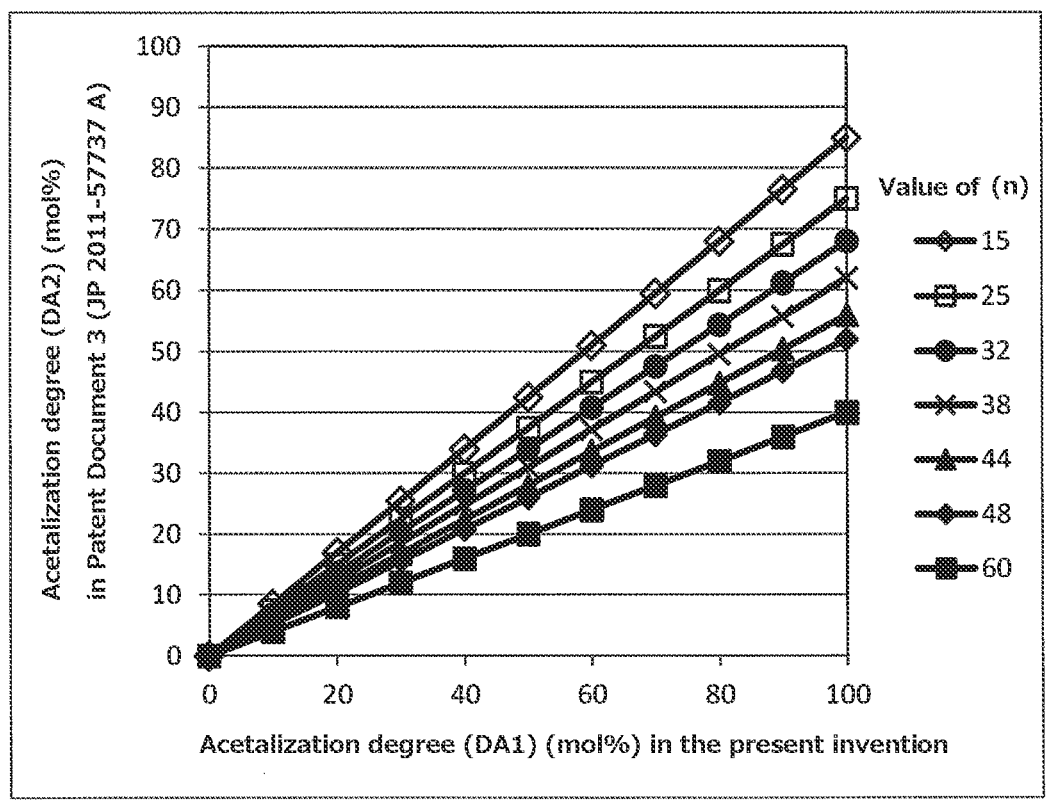

MODIFIED VINYL ACETAL RESIN FOR INTERLAYER FILM OF LAMINATED GLASS

CROSS-REFERENCE TO RELATED APPLICATION

This application claims benefit under Article 4 of the Paris Convention based on Japanese Patent Application No. 2019-64672 filed in Japan on Mar. 28, 2019, and Japanese Patent Application No. 2019-130250 filed in Japan on Jul. 12, 2019, incorporated herein by reference in their entirety.

TECHNICAL FIELD

The present invention relates to a modified vinyl acetal resin for an interlayer film of laminated glass, and more specifically to a modified vinyl acetal resin for an interlayer film of laminated glass having excellent transparency, impact resistance, heat resistance and molding ability.

BACKGROUND ART

Laminated glass is safe because glass fragments are less likely to be scattered even if it is damaged by an external impact, and therefore it is widely used as a windshield, side glass, rear glass for vehicles such as automobiles, and window glass for aircrafts, buildings and the like.

In recent years, the demand for improving the performance of laminated glass is increasing more and more. In particular, when laminated glass is used for structural uses (facade) of buildings, for example, it is required that the glass not be penetrated or sag (self-supporting properties) even if it is broken under high temperature conditions. In order to satisfy the required performance, the interlayer film for laminated glass itself must keep a certain level or more of elastic modulus even under high temperature conditions, in other words, have heat resistance.

As for the interlayer film for laminated glass used for laminated glass, it is common that a large amount of vinyl butyral resin is used, and a liquid plasticizer and an adhesive force adjusting agent are blended to adjust molding and processing ability, penetration resistance and adhesiveness to glass. By blending the liquid plasticizer, the vinyl butyral resin is softened and the heat resistance is significantly reduced. Further, when it is used by reducing the blending amount of the liquid plasticizer or without blending it, the heat resistance is improved, however, the molding and processing ability deteriorates. Therefore, it is necessary to raise the molding temperature. As a result, coloring of the obtained sheet shaped article progresses remarkably.

Patent Documents 1 and 2 describe using a vinyl acetal-based polymer modified with an α-olefin as an interlayer film of laminated glass. However, in these inventions, the problems pointed out above, such as the necessity of using a large amount of plasticizer, are not taken into consideration, and have not been improved.

Patent Document 3 describes a sheet made of a polyvinyl acetal resin having an ethylene content of 0.5 to 40 mol % and an acetalization degree of 30 mol % or more (claim 1). Although two types of definitions have conventionally been used for the acetalization degree, Patent Document 3 does not describe the definition of the acetalization degree. Therefore, the meaning of the acetalization degree in Patent Document 3 cannot be confirmed unless actual measurement is conducted. It is described that this sheet has high transparency, strength and flexibility, and it may be used for laminated glass (paragraph [0058]).

However, in examples of Patent Document 3, when molding a sheet, triethylene glycol-di-2-ethylhexanoate, namely, a plasticizer is blended in an amount as large as 30 parts by mass with respect to 100 parts by mass of the polyvinyl acetal resin. As pointed out earlier, the heat resistance is significantly reduced when a large amount of plasticizer is used. In addition, since the acetalization degree is 30 mol % or more, the molded sheet has a problem in heat resistance.

Patent Document 4 describes a laminated glass obtained by interposing a thermosetting resin prepared by blending an organic peroxide and a silane coupling agent with an ionomer resin, in which an ethylene-methacrylic acid copolymer is intermolecularly bonded with metal ions, between glass plates, integrating therewith, and thermally curing this resin layer (claim 1). The laminated glass is explained as being improved one of conventional laminated glass using a polyvinyl butyral resin as an interlayer, with respect to impact resistance and penetration resistance, and that it is excellent in impact resistance, penetration resistance, processing ability and transparency (paragraph [0015]).

However, the ionomer resin has a problem in that it easily causes whitening or poor adhesiveness unless the temperature conditions at the time of molding are strictly adjusted, and in particular in that it easily causes whitening when the cooling rate is reduced after melt molding. For example, when the laminated glass sandwiching a sheet shaped article of the ionomer resin is cooled, whitening occurs in the central portion where the cooling rate is low, and the transparency is reduced. As described above, laminated glass using the ionomer resin requires strict controlling in producing conditions, is high in producing cost, and is difficult in industrial mass production.

PRIOR ART DOCUMENTS

Patent Documents

Patent Document 1: JP S63-79741 A
Patent Document 2: JP 2004-68013 A
Patent Document 3: JP 2011-57737 A
Patent Document 4: JP H9-30846 A

SUMMARY OF INVENTION

Problem to be Solved by Invention

The present invention solves the above-mentioned conventional problems, and an object thereof is to provide a modified vinyl acetal resin for an interlayer film of laminated glass having excellent transparency, impact resistance, heat resistance and molding ability.

Means for Solving Problem

The present invention provides a modified vinyl acetal resin for an interlayer film of laminated glass comprising 25 to 60 mol % of ethylene units and 24 to 71 mol % of vinyl alcohol units, based on all the monomer units constituting the resin, and having an acetalization degree of 5 mol % or more and less than 40 mol %.

Also, the present invention provides a resin composition for an interlayer film of laminated glass containing the modified vinyl acetal resin in an amount of 80% by mass or more.

In one embodiment, the resin composition has a plasticizer content of 1% by mass or less.

Also, the present invention provides a sheet shaped article substantially composed of the modified vinyl acetal resin or the resin composition.

In one embodiment, the sheet shaped article has a thickness of 0.10 to 3 mm.

Also, the present invention provides an interlayer film for laminated glass obtained by using the sheet shaped article.

Also, the present invention provides laminated glass having two glass plates and the interlayer film for laminated glass, which is arranged between the two glass plates.

Effect of Invention

The modified vinyl acetal resin of the present invention has balanced transparency, impact strength, heat resistance, and molding ability required for interlayer films for laminated glass. The modified vinyl acetal resin of the present invention is particularly excellent in impact strength and heat resistance. Therefore, the modified vinyl acetal resin of the present invention is particularly preferably used as an interlayer film for laminated glass of structural use, which is required to have penetration resistance and self-supporting properties under a high temperature environment. The impact strength of the resin correlates with the penetration resistance of its sheet shaped article. The heat resistance of the resin correlates with the self-supporting properties of its sheet shaped article under a high temperature environment.

BRIEF DESCRIPTION OF DRAWINGS

FIG. 1 is a graph showing the relationship between the acetalization degree (DA1) in the present invention, and the acetalization degree (DA2) in Patent Document 3.

DESCRIPTION OF EMBODIMENTS

Hereinafter, suitable embodiments for carrying out the present invention will be described. The embodiments described below show an example of the present invention, and the scope of the present invention is not to be narrowly interpreted by any of these.

(Modified Vinyl Acetal Resin)

The modified vinyl acetal resin in the present invention is obtained by making a vinyl alcohol resin copolymerized with ethylene (hereinafter referred to as an ethylene vinyl alcohol copolymer) and an aldehyde to cause the acetalization reaction in the presence of an acidic catalyst.

Examples of the ethylene vinyl alcohol copolymer may include those obtained by copolymerizing ethylene and a vinyl ester-based monomer and saponifying the obtained copolymer. As a method for copolymerizing ethylene and a vinyl ester-based monomer, conventionally known methods such as a solution polymerization method, a bulk polymerization method, a suspension polymerization method, and an emulsion polymerization method may be applied. As a polymerization initiator, an azo-based initiator, a peroxide-based initiator, a redox-based initiator, and the like are appropriately selected depending on the polymerization method. For the saponification reaction, the reaction of alcohol decomposition, hydrolysis or the like, which employs a conventionally known alkali catalyst or an acid catalyst, may be applied. Among these, the saponification reaction employing methanol as a solvent and a caustic soda (NaOH) catalyst is convenient.

The saponification degree of the ethylene vinyl alcohol copolymer is not particularly limited, but is preferably 95 mol % or more, more preferably 98 mol % or more, even more preferably 99 mol % or more, and most preferably 99.9 mol % or more.

Examples of the vinyl ester-based monomer serving as a raw material for the ethylene vinyl alcohol copolymer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate and the like, but vinyl acetate is particularly preferred.

The amount of ethylene units of the ethylene vinyl alcohol copolymer is preferably 25 to 60 mol %, more preferably 30 to 55 mol %, and still more preferably 35 to 50 mol %. By satisfying this range, ethylene units of the modified vinyl acetal resin described below may be adjusted to a suitable range.

The MFR of the ethylene vinyl alcohol copolymer at 190° C. and a load of 2.16 kg is preferably 1 to 30 g/10 min, more preferably 2 to 20 g/10 min, and even more preferably 3 to 10 g/10 min. By satisfying this range, the MFR of the modified vinyl acetal resin described below may be adjusted to a suitable range.

The method for producing the modified vinyl acetal resin of the present invention is not particularly limited, but it may be produced by a known production method. For example, a method of adding an aldehyde to an ethylene vinyl alcohol copolymer solution under acidic conditions to cause an acetalization reaction, or a method of adding an aldehyde to an ethylene vinyl alcohol copolymer dispersion under acidic conditions to cause an acetalization reaction is cited.

The intended modified vinyl acetal resin is obtained by neutralizing the reaction product obtained after the acetalization reaction with alkali, washing it with water, and removing the solvent.

The solvent for producing the modified vinyl acetal resin is not particularly limited, and examples thereof include water, alcohols, dimethyl sulfoxide, and a mixed solvent of water and alcohols.

The dispersion medium for producing the modified vinyl acetal resin is not particularly limited, and examples thereof include water and an alcohol.

The catalyst for the acetalization reaction is not particularly limited, and both an organic acid and an inorganic acid may be used. Examples thereof include acetic acid, p-toluenesulfonic acid, nitric acid, sulfuric acid, hydrochloric acid, carbonic acid, and the like. In particular, inorganic acids such as hydrochloric acid, sulfuric acid, and nitric acid are preferably used because they are easy to wash after the reaction.

The aldehyde used in the acetalization reaction is not particularly limited, and for example, formaldehyde, acetaldehyde, propionaldehyde, butylaldehyde, hexylaldehyde, benzaldehyde, isobutylaldehyde, 2-ethylhexylaldehyde, 2-methylbutylaldehyde, trimethylacetaldehyde, 2-methylpentylaldehyde, 2,2-dimethylbutylaldehyde, 2-ethylbutylaldehyde, 3,5,5-trimethylhexylaldehyde, and the like are used, and butylaldehyde, benzaldehyde, isobutylaldehyde are preferred in terms of heat resistance and optical characteristics. In addition, these aldehydes may be used alone or in combination of two or more.

The alkali used for neutralizing the reaction product is not particularly limited, and examples thereof include sodium hydroxide, potassium hydroxide, ammonia, sodium acetate, sodium carbonate, sodium hydrogen carbonate, potassium carbonate and the like.

The amount of ethylene units of the modified vinyl acetal resin of the present invention is 25 to 60 mol %, preferably 30 to 55 mol %, and more preferably 35 to 50 mol %, based on all the monomer units constituting the resin. If the above ratio of ethylene units is less than 25 mol %, the impact resistance of the modified vinyl acetal resin of the present invention is easily reduced, and if it exceeds 60 mol %, the heat resistance easily deteriorates.

The acetalization degree of the modified vinyl acetal resin of the present invention is 5 mol % or more and less than 40 mol %. The lower limit of the acetalization degree is more preferred in the order of 6 mol % or more, 7 mol % or more, 8 mol % or more, and 9 mol % or more, and 10 mol % or more is most preferred. If the degree of acetalization is less than 5 mol %, the modified vinyl acetal resin of the present invention has high crystallinity, so that transparency easily deteriorates. The upper limit of the degree of acetalization is more preferred in the order of 38 mol % or less, 36 mol % or less, 34 mol % or less, and 32 mol % or less, and most preferably less than 30 mol %. The upper limit of the degree of acetalization may be 29 mol % or less, 28 mol % or less, 27 mol % or less, 26 mol % or less, ox less than 25 mol %. If the acetalization degree is 40 mol % or more, heat resistance and glass adhesiveness are likely to deteriorate.

Two kinds of definitions has been used for the acetalization degree of the modified vinyl acetal resin. One is defined as the ratio of acetalized vinyl alcohol units out of the structural units other than ethylene units. In other words, for example, it refers to the ratio of acetalized vinyl alcohol units out of the sum of acetalized vinyl alcohol units, non-acetalized vinyl alcohol units, and vinyl acetate units. The acetalization degree is found by acetalization degree (mol %)=$\{k/(k+l+m)\} \times 100$ when (l) is the molar ratio of non-acetalized vinyl alcohol units, (m) is the molar ratio of vinyl acetate units, and (k) is the molar ratio of acetalized vinyl alcohol units.

Another is defined as the ratio of acetalized vinyl alcohol units out of all the monomer units, including ethylene units as well. In other words, for example, it refers to the ratio of acetalized vinyl alcohol units out of the sum of ethylene units, acetalized vinyl alcohol units, non-acetalized vinyl alcohol units, and vinyl acetate units. The acetalization degree is found by acetalization degree (mol %)=$(k/(k+l+m+n)) \times 100$ when (l) is the molar ratio of non-acetalized vinyl alcohol units, (m) is the molar ratio of vinyl acetate units, (k) is the molar ratio of acetalized vinyl alcohol units, and (n) is the molar ratio of ethylene units.

In the present invention, the former DA1 is adopted as the acetalization degree. That is, the ratio of acetalized vinyl alcohol units out of the structural units other than ethylene units is defined as the acetalization degree.

The relationship between the former acetalization degree (DA1) and the latter acetalization degree (DA2) is represented by the formula DA2=$((100-n)/100) \times$ DA1    [Equation 1]

wherein n indicates the molar ratio of ethylene units out of all the monomer units.

FIG. 1 is a graph showing the relationship between the acetalization degree (DA1) and the acetalization degree (DA2) when, for example, n=15, 25, 32, 38, 44, 48, 60.

The acetalization degree of the modified vinyl acetal resin of the present invention may be determined by the following procedure. First, the modified vinyl acetal resin is dissolved in ethanol, a 2N hydroxylamine hydrochloride solution and hydrochloric acid are added, and the mixture is stirred in a water bath with a cooler for 4 hours. After cooling, ammonia water is added to neutralize the mixture, and then methanol is added to precipitate the mixture, followed by washing and drying to obtain an ethylene vinyl alcohol copolymer. Next, the obtained ethylene vinyl alcohol copolymer is dissolved in DMSO (dimethyl sulfoxide) at 120° C., and cooled to room temperature. Thereafter, N,N-dimethyl-4-aminopyridine and acetic anhydride are added, and the mixture was reacted with stirring for 1 hour. The reaction mixture is then precipitated with ion-exchanged water and acetone, followed by washing and drying to obtain the ethylene-vinyl acetate copolymer.

The molar ratio (n) of ethylene units in the ethylene vinyl alcohol copolymer may be calculated, based on a spectrum obtained by dissolving the obtained ethylene vinyl acetate copolymer in DMSO-$d_6$ and measuring it with a 400 MHz proton NMR measurement device at 256 times of integration, by using the intensity ratio of methine protons derived from ethylene units and vinyl acetate units (peaks from 1.1 to 1.9 ppm) to terminal methyl protons derived from vinyl acetate units (peak at 2.0 ppm).

The molar ratio of vinyl alcohol units (l), the molar ratio of vinyl acetate units (m), and the molar ratio of acetalized vinyl alcohol units (k) with respect to all the monomer units constituting the modified vinyl acetal resin are calculated, based on a spectrum obtained by dissolving the modified vinyl acetal resin in DMSO-$d_6$ and measuring it with a 400 MHz proton NMR measurement device at 256 times of integration, by using the intensity ratio of methine protons derived from ethylene units, vinyl alcohol units and vinyl ester units (peaks from 1.0 to 1.8 ppm) to terminal methyl protons derived from acetal units (peaks from 0.8 to 1.0 ppm), and the molar ratio (n) of ethylene units in the ethylene vinyl alcohol copolymer.

The acetalization degree of the modified vinyl acetal resin is determined by acetalization degree(mol %)=$\{k/(k+l+m)\} \times 100$ using the determined molar ratio of vinyl alcohol units (l), molar ratio of vinyl acetate units (m), and molar ratio of acetalized vinyl alcohol units (k).

As another method, the ethylene vinyl alcohol copolymer before the acetalization reaction is dissolved in DMSO at 120° C., cooled to room temperature. Thereafter, N,N-dimethyl-4-aminopyridine and acetic anhydride are added, and the mixture is reacted with stirring for 1 hour. The reaction mixture is then precipitated with ion-exchanged water and acetone, followed by washing and drying to obtain an ethylene-vinyl acetate copolymer.

The molar ratio (n) of ethylene units in the ethylene vinyl alcohol copolymer may be calculated, based on a spectrum obtained by dissolving the obtained ethylene vinyl acetate copolymer in DMSO-$d_6$ and measuring it with a 400 MHz proton NMR measurement device at 256 times of integration, by using the intensity ratio of methine protons derived from ethylene units and vinyl acetate units (peaks from 1.1 to 1.9 ppm) to terminal methyl protons derived from vinyl acetate units (peak at 2.0 ppm). Since ethylene units are not affected by the acetalization reaction, the molar ratio (n) of ethylene units in the ethylene vinyl alcohol copolymer before the acetalization reaction is equal to the molar ratio (n) of ethylene units in the modified vinyl acetal resin obtained after the acetalization reaction.

The molar ratio of vinyl alcohol units (l), the molar ratio of vinyl acetate units (m), and the molar ratio of acetalized vinyl alcohol units (k) with respect to all the monomer units constituting the modified vinyl acetal resin are calculated, based on a spectrum obtained by dissolving the modified vinyl acetal resin in DMSO-$d_6$ and measuring it with a 400 MHz proton NMR measurement device at 256 times of integration, by using the intensity ratio of methine protons derived from ethylene units, vinyl alcohol units and vinyl ester units (peaks from 1.0 to 1.8 ppm) to terminal methyl protons derived from acetal units (peaks from 0.8 to 1.0 ppm), and the molar ratio (n) of ethylene units in the ethylene vinyl alcohol copolymer.

The acetalization degree of the modified vinyl acetal resin may be determined by acetalization degree (mol %)=$\{k/(k+l+m)\}\times 100$ using the determined molar ratio of vinyl alcohol units (l), molar ratio of vinyl acetate units (m), and molar ratio of acetalized vinyl alcohol units (k).

As yet another method, according to the method described in JIS K6728:1977, the mass ratio of non-acetylated vinyl alcohol units ($l_0$), the mass ratio of vinyl acetate units ($m_0$), and the mass ratio of acetalized vinyl alcohol units ($k_0$) are respectively determined by titration, and the mass ratio of ethylene units ($n_0$) is determined by $n_0=1-l_0-m_0-k_0$, from which the molar ratio of non-acetalized vinyl alcohol units (l), the molar ratio of vinyl acetate units (m), and the molar ratio of acetalized vinyl alcohol units (k) are calculated, and then the acetalization degree may be determined by acetalization degree (mol %)=$\{k/(l+m+k)\}\times 100$.

The amount of vinyl alcohol units of the modified vinyl acetal resin of the present invention is 24 to 71 mol % based on all the monomer units constituting the resin. The lower limit of the molar ratio of vinyl alcohol units is more preferred in the order of 24.8 mol % or more, 25.6 mol % or more, 26.4 mol % or more, and 27.2 mol % or more, and 28 mol % or more is most preferred. The lower limit of the molar ratio of vinyl alcohol units may be 26 mol % or more, 32 mol % or more, and 38 mol % or more. When the ratio of vinyl alcohol units is less than 24 mol %, glass adhesiveness of the modified vinyl acetal resin of the present invention easily deteriorates. The upper limit of the molar ratio of vinyl alcohol units is more preferred in the order of 70.5 mol % or less, 69.8 mol % or less, 69 mol % or less, and 68.3 mol % or less, and 67.5% or less is most preferred. The upper limit of the molar ratio of vinyl alcohol units may be 65 mol % or less, and 59 mol % or less. When the ratio of vinyl alcohol units exceeds 71 mol %, the glass adhesiveness becomes high, but the transparency easily deteriorates.

The mol % based on the total monomer units constituting the modified vinyl acetal resin of the present invention is calculated by converting 1 mol of acetal units into 2 mol of the vinyl alcohol units. For example, an ethylene unit of a modified vinyl acetal resin composed of 44.0 mol of ethylene units, 44.8 mol of vinyl alcohol units and 5.6 mol of acetal units is 44.0 mol %, a vinyl alcohol unit is 44.8 mol %, and an acetalization degree is 20.0 mol %.

The MFR of the modified vinyl acetal resin of the present invention at 190° C. and under a load of 2.16 kg is preferred in the order of 0.1 to 100 g/10 min, 1 to 50 g/10 min, 2 to 30 g/10 min, and 3 to 20 g/10 min. If the MFR at 190° C. under a load of 2.16 kg is less than 0.1 g/10 min, sufficient processing ability (fluidity) cannot be obtained in the appropriate molding temperature range during mold processing, and it is necessary to raise the molding temperature. The resulting molded product tends to be easily colored. If the MFR at 190° C. under a load of 2.16 kg exceeds 100 g/10 min, a sufficient melt tension cannot be obtained in the appropriate molding temperature range during mold processing, and problems such as deterioration of film forming stability and surface conditions of the molded product tend to easily occur.

(Resin Composition)

The resin composition of the present invention preferably comprises 80% by mass or more (including 100%), more preferably 90% by mass or more (including 100%), and even more preferably 95% by mass or more (including 100%) of a modified vinyl acetal resin.

The resin composition of the present invention may optionally contain other thermoplastic resins in addition to the modified vinyl acetal resin. The other thermoplastic resins are not particularly limited, and examples thereof include (meth)acrylic resins, polyvinyl butyral-based resins, ionomer-based resins and the like.

When the resin composition contains the other thermoplastic resins, the content thereof is preferably 20% by mass or less, more preferably 15% by mass or less, and even more preferably 10% by mass or less based on the total mass of the resin composition. When the content of the other thermoplastic resins in the resin composition exceeds 20% by mass, the transparency, impact resistance, and adhesiveness to a substrate such as glass tend to be easily reduced.

The resin composition of the present invention may further contain additives such as a plasticizer, an antioxidant, an ultraviolet absorber, an adhesiveness improver, an anti-blocking agent, a silane coupling agent, a pigment, a dye, and a functional inorganic compound as necessary. Furthermore, if necessary, the plasticizer and various additives may be extracted or washed to reduce the content of these plasticizers and additives, and then the plasticizer and various additives may be added again.

When the resin composition contains the additives, the content thereof is preferably 20% by mass or less, more preferably 15% by mass or less, even more preferably 10% by mass or less, and most preferably 5% by mass or less, based on the total mass of the resin composition. If the content of the various additives exceeds 20% by mass, problems tend to easily occur, such as not being able to sufficiently obtain self-supporting properties under high temperature conditions (heat resistance), and the occurrence of bleed out when used as an interlayer film for laminated glass for a long period of time.

In particular, since plasticizers have a high effect of lowering self-supporting properties (heat resistance) under high temperature conditions due to their properties, the content thereof is preferably 1% by mass or less (including 0% by mass) with respect to the total mass of the resin composition, more preferably 0.5% by mass or less (including 0% by mass), and even more preferably 0.1% by mass or less (including 0% by mass).

The plasticizer used is not particularly limited, but includes, for example, triethylene glycol-di-2-ethylhexanoate, tetraethylene glycol-di-2-ethylhexanoate, di-(2-butoxyethyl)-adipic acid ester (DBEA), di-(2-butoxyethyl)-sebacic acid ester (DBES), di-(2-butoxyethyl)-azelaic acid ester, di-(2-butoxyethyl)-glutaric acid ester, di-(2-butoxyethoxyethyl)-adipic acid ester (DBEEA), di-(2-butoxyethoxyethyl)-sebacic acid ester (DBEES), di-(2-butoxyethoxyethyl)-azelaic acid ester, di-(2-butoxyethoxyethyl)-glutaric acid ester, di-(2-hexoxyethyl)-adipic acid ester, di-(2-hexoxyethyl)-sebacic acid ester, di-(2-hexoxyethyl)-azelaic acid ester, di-(2-hexoxyethyl)-glutaric acid ester, di-(2-hexoxyethoxyethyl)-adipic acid ester, di-(2-hexoxyethoxyethyl)-sebacic acid ester, di-(2-hexoxyethoxyethyl)-azelaic acid ester, di-(2-hexoxyethoxyethyl)-glutaric acid esters, di-(2-butoxyethyl)-phthalic acid ester and/or di-(2-butoxyethoxyethyl)-phthalic acid ester and the like. Among these, a plasticizer in which the sum of the number of carbon atoms and the number of oxygen atoms constituting the molecule is 28 or more is preferred. For example, triethylene glycol-di-2-ethylhexanoate, tetraethylene glycol-di-2-ethylhexanoate, di-(2-butoxyethoxyethyl)-adipic acid ester, di-(2-butoxyethoxyethyl)-sebacic acid ester and the like. The above plasticizers may be used alone, or in combination of two or more.

Further, the modified vinyl acetal resin of the present invention may contain an antioxidant. Examples of the antioxidant used include phenolic antioxidants, phosphorus-based antioxidants, sulfur-based antioxidants, and the like. Among these, phenolic antioxidants are preferred, and alkyl-substituted phenolic antioxidants are particularly preferred.

Examples of phenolic antioxidants are, for example, acrylate-based compounds such as 2-t-butyl-6-(3-t-butyl-2-hydroxy-5-methylbenzyl)-4-methylphenyl acrylate or 2,4-di-t-amyl-6-(1-(3,5-di-t-amyl-2-hydroxyphenyl)ethyl)phenyl acrylate, alkyl-substituted phenolic compounds such as 2,6-di-t-butyl-4-methylphenol, 2,6-di-t-butyl-4-ethyl phenol, octadecyl-3-(3,5-)di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5,5]undecane, 1,1,3-tris(2-methyl-4-hydroxy-5-t-butylphenyl) butane, 1,3,5-trimethyl-2,4,6-tris(3,5-di-t-butyl-4-hydroxybenzyl)benzene, tetrakis(methylene-3)-(3',5'-di-t-butyl-4'-hydroxyphenyl)propionate)methane or triethylene glycol bis(3-(3-t-butyl-4-hydroxy-5-methylphenyl)propionate), triazine group-containing phenolic compounds such as 6-(4-hydroxy-3,5-di-t-butylanilino)-2,4-bis-octylthio-1,3,5-triazine, 6-(4-hydroxy-3-methyl-5-t-butylanilino)-2,4-bis-octylthio-1,3,5-triazine, or 2-octylthio-4,6-bis-(3,5-di-t-butyl-4-oxyanilino)-1,3,5-triazine, and the like.

Phosphorus-based antioxidants include, for example, monophosphite compounds such as triphenylphosphite, diphenylisodecylphosphite, phenyldiisodecylphosphite, tris (nonylphenyl) phosphite, tris(dinonylphenyl) phosphite, tris (2-t-butyl)-4-methylphenyl) phosphite, tris(cyclohexylphenyl) phosphite, 2,2-methylenebis(4,6-di-t-butylphenyl)octyl phosphite, 9,10-dihydro-9-oxa-10-oxa-phenanthrene-10-oxide, 10-(3,5-di-t-butyl-4-hydroxybenzyl)-9,10-dihydro-9-oxa-10-phosphaphenanthrene-10-oxide or 10-decyloxy-9,10-dihydro-9-oxa-10-phosphaphenanthrene, diphosphate compounds such as 4,4'-butylidene-bis(3-methyl-6-t-butylphenyl-di-tridecylphosphite), 4,4'-isopropylidene-bis (phenyl-di-alkyl (C12 to C15) phosphite), 4,4'-isopropylidene-bis(diphenylmonoalkyl (C12 to C15) phosphite), 1,1,3-tris(2-methyl-4-di-tridecylphosphite-5-t-butylphenyl) butane or tetrakis(2,4-di-t-butylphenyl)-4,4'-biphenylene phosphite and the like. Among these, monophosphite compounds are preferred.

Sulfur-based antioxidants include, for example, dilauryl 3,3'-thiodipropionate, distearyl 3,3'-thiodipropionate, laurylstearyl 3,3'-thiodipropionate, and pentaerythritol-tetrakis-(β-lauryl-thiopropionate), 3,9-bis (2-dodecylthioethyl)-2,4,8,10-tetraoxaspiro[5,5]undecane and the like.

These antioxidants may be used alone or in combination of two or more. The blending amount of the antioxidant is preferably 0.001 to 5 parts by mass based on 100 parts by mass of the modified vinyl acetal resin, and more preferably 0.01 to 1 part by mass. These antioxidants may be added when producing the modified vinyl acetal resin of the present invention. As another addition method, it may be added to the modified vinyl acetal resin when molding the sheet shaped article of the present invention.

Further, the modified vinyl acetal resin of the present invention may contain an ultraviolet absorber. Ultraviolet protectors used include benzotriazole-based ultraviolet absorbers such as 2-(5-methyl-2-hydroxyphenyl)benzotriazole, 2-[2-hydroxy-3,5-bis(α,α'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl) benzotriazole or 2-(2'-hydroxy-5'-t-octylphenyl) benzotriazole-based ultraviolet absorbers; hindered amine-based ultraviolet absorbers such as 2,2,6,6-tetramethyl-4-piperidylbenzoate, bis(2,2,6,6-tetramethyl-4-piperidyl) sebacate, bis(1,2,2,6,6-pentamethyl-4-piperidyl)-2-(3,5-di-t-butyl-4-hydroxybenzyl)-2-n-butylmalonate or 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; benzoate-based ultraviolet absorbers such as 2,4-di-t-butylphenyl-3,5-di-t-butyl-4-hydroxybenzoate or hexadecyl-3,5-di-t-butyl-4-hydroxybenzoate, and the like. The addition amount of these ultraviolet absorbers is preferably 10 to 50000 ppm, based on the mass of the modified vinyl acetal resin, and more preferably in the range of 100 to 10000 ppm. In addition, these ultraviolet absorbers may be used in combination of two or more. These ultraviolet absorbers may be added when producing the modified vinyl acetal resin of the present invention. As another addition method, it may be added to the modified vinyl acetal resin when molding the sheet shaped article of the present invention.

Further, the modified vinyl acetal resin of the present invention may contain an adhesive improver. As the adhesive improver used, for example, those disclosed in WO 03/033583 A1 may be used, and alkali metal salts and/or alkaline earth metal salts of organic acids are preferably used, among which potassium acetate and/or magnesium acetate and the like are preferred. Further, other additives such as silane couplings may be added. The optimal addition amount of the adhesive improver is different depending on the additive used, and also different depending on the place where the module or laminated glass obtained is used, but the adhesive force of the obtained sheet to the glass is preferably adjusted to be generally 3 to 10 in the Panmel test (described in WO 03/033583 A1 and the like). It is preferably adjusted to be 3 to 6 especially when high penetration resistance is required, and 7 to 10 when high glass shatterproof properties are required. When high glass shatterproof properties are required, it is also a useful method not to add an adhesive improver.

Further, the modified vinyl acetal resin of the present invention may contain a silane coupling agent. The adhesive improvers used include, for example, 3-glycidoxypropyltrimethoxysilane, 3-glycidoxypropyldiethoxysilane, N-(2-aminoethyl)-3-aminopropyltrimethoxysilane, N-(2-aminoethyl)-3-aminopropyldiethoxysilane, N-(2-aminoethyl)-3-aminopropyldiethoxysilane and the like.

These silane coupling agents may be used alone or in combination of two or more. The blending amount of the silane coupling agent is preferably 0.001 to 5 parts by mass with respect to 100 parts by mass of the modified vinyl acetal resin, and more preferably 0.01 to 1 part by mass. These silane coupling agents may be added when producing the modified vinyl acetal resin of the present invention. As another addition method, it may be added to the modified vinyl acetal resin when molding the sheet shaped article of the present invention.

(Sheet Shaped Article)

The storage elastic modulus (E') of the sheet shaped article composed of the modified vinyl acetal resin of the present invention or a resin composition containing the same at a measurement temperature of 50° C. and a frequency of 1 Hz is preferably 20 to 1,000 MPa, more preferably 30 to 900 MPa, and even more preferably 40 to 800 MPa. When the storage elastic modulus (E') is in the above range, the self-supporting properties are further improved. In the present invention, the storage elastic modulus (E') was measured by the method described in Examples.

The method for producing the sheet shaped article is not particularly limited, and a known method is used. Specifically, the resin composition may be formed in a sheet-like shape by extrusion molding, press molding, blow molding, injection molding, a solution casting method or the like. In particular, a method of feeding the resin composition and the additives to an extruder, kneading and melting the mixture, extruding the molten mixture from a die, and taking over the extrudate by a take-over machine to form it in a plate form is preferred. The resin temperature during extrusion is preferably 170 to 250° C., more preferably 180 to 240° C., and even more preferably 190 to 230° C. If the resin temperature becomes too high, the modified vinyl acetal resin will decompose and the content of volatile substances will increase. To the contrary, if the temperature is too low, the content of volatile substances will also increase. In order to efficiently remove the volatile substances, it is preferred to remove the volatile substances by reducing the pressure from a vent port of the extruder.

In the sheet shaped article of the present invention, it is preferred to provide irregularities on the surface in order to prevent molded products from adhering to each other, and to improve the degassing property in a lamination step. As a method of providing irregularities, a conventionally known method may be used, and examples thereof include a method of providing a melt fracture structure by adjusting extrusion conditions, a method of imparting an embossed structure to an extruded sheet, and the like. As the embossing depth and shape, conventionally publicly known ones may be used.

The thickness of the sheet shaped article of the present invention is not particularly limited, but is preferably 0.10 to 3.0 mm, more preferably 0.40 to 2.8 mm, and even more preferably 0.70 to 2.6 mm. If the sheet shaped article is thinner than 0.10 mm, it tends to be difficult to satisfy the penetration resistant performance of the laminated glass, and if it is thicker than 3.0 mm, the cost of the sheet itself is high, and the cycle time of the lamination step also tends to be longer, which is not preferred. For the sheet shaped article, the molded product may be used as it is, or two or more molded products may be stacked and adjusted to the desired thickness.

The penetration resistance of the sheet shaped article of the present invention preferably has a penetration energy of 11 J or more, more preferably 13 J or more, and even more preferably 15 J or more in a falling weight type impact test described below. When the penetration resistance of a sheet shaped article is less than 11 J, it tends to be difficult to use the laminated glass using the sheet shaped article as the interlayer film because a sufficient value cannot be obtained.

(Interlayer Film for Laminated Glass)

The sheet shaped article of the present invention is useful as an interlayer film for laminated glass. The interlayer film for laminated glass is particularly preferable as an interlayer film of laminated glass for structural material because it is excellent in adhesiveness to a substrate such as glass, transparency, and self-supporting properties.

Further, it is suitable not only as an interlayer film of laminated glass for structural material, but also as an interlayer film for laminated glass in various applications such as moving bodies such as automobiles, buildings, and solar cells. However, it is not limited to these applications.

(Laminated Glass)

Laminated glass may be fabricated by inserting and laminating the sheet shaped article of the present invention between two or more pieces of glass made of inorganic glass or organic glass. The glass laminated with the interlayer film for laminated glass of the present invention is not particularly limited, and in addition to inorganic glass such as float glass, tempered glass, wired glass, or heat ray absorbing plate glass, conventionally known organic glass such as polymethyl methacrylate, or polycarbonate may be used. The thickness of the glass is not particularly limited, but is preferably 1 to 10 mm, and more preferably 2 to 6 mm.

The interlayer film used for laminated glass of the present invention may be composed of only a layer (x) containing the modified vinyl acetal resin or a resin composition, and may be a multilayer film containing at least one layer (x). The multilayer film is not particularly limited, but includes, for example, a two-layer film in which the layer (x) and another layer are laminated, a three-layer film in which another layer is arranged between the two layers (x), and the like.

Examples of the other layer include a layer containing a known resin. As the resin, for example, polyethylene, polypropylene, polyvinyl chloride, polystyrene, polyurethane, polytetrafluoroethylene, acrylic resin, polyamide, polyacetal, polycarbonate, among polyesters, polyethylene terephthalate, polybutylene terephthalate, cyclic polyolefin, polyphenylensulfide, polytetrafluoroethylene, polysulfone, polyethersulfone, polyarylate, liquid crystal polymer, polyimide and the like may be used. In addition, as necessary, other layers may also contain a plasticizer, an antioxidant, an ultraviolet absorber, a light stabilizer, an antiblocking agent, a pigment, a dye, and a heat shield material (for example, an inorganic heat shield material or an organic heat shield material having infrared absorbing ability), a functional inorganic compound and the like.

As a laminating method for obtaining the above-mentioned laminated glass, a known method may be adopted, for example, a method using a vacuum laminator device, a method using a vacuum bag, a method using a vacuum ring, a method using a nip roll, and the like are cited. In addition, after the temporary bonding, a method of putting in an autoclaving step may also be additionally performed.

When the nip roll is used, for example, a method is cited in which first temporary bonding is performed at a temperature equal to or lower than the flow start temperature of the modified vinyl acetal resin, and then temporary bonding is further performed under conditions closer to the flow start temperature. Specifically, for example, a method of heating to 30 to 70° C. with an infrared heater, degassing with a roll, and further heating to 50 to 120° C., followed by contact bonding with a roll to provide bonding or temporary bonding is cited.

The additional autoclaving step performed after the temporary bonding is carried out at a temperature of 130 to 145° C. for about 2 hours under a pressure of about 1 to 1.5 MPa, for example, though depending on the thickness and composition of the module and laminated glass.

The laminated glass of the present invention preferably has excellent transparency. For example, the haze when the laminated glass is slowly cooled under the conditions described below is preferably 2% or less, more preferably 1.6% or less, and even more preferably 1.2% or less.

The laminated glass of the present invention preferably has excellent adhesive force to glass. For example, the peel stress in the compression shear strength test carried out by the method described below is preferably 20 to 40 MPa, more preferably 22 to 38 MPa, and even more preferably 24 to 36 MPa. If the peel stress is less than 20 MPa, the adhesive force to glass is insufficient and the glass tends to be scattered when the glass is broken, and if it exceeds 40 MPa, the adhesive force to the glass is too strong and the penetration resistance may deteriorate when the glass is broken.

Since the laminated glass of the present invention has excellent transparency, impact resistance and heat resistance, it may be suitably used for an automobile windshield, automobile side glass, automobile sunroof, automobile rear glass, head-up display glass, facade, laminates for outer walls and roofs, building materials such as panels, doors, windows, walls, roofs, sunroofs, sound insulation walls, display windows, balconies, and handrail walls, partition glass members for conference rooms, solar panels, and the like.

EXAMPLES

Hereinafter, the present invention will be described in more detail with reference to Examples, but the present invention is not limited to these examples.

[Ethylene Units, Vinyl Alcohol Units, Acetal Units, Acetalization Degree]

An ethylene vinyl alcohol copolymer before the acetalization reaction was dissolved in DMSO at 120° C., cooled under room temperature. Thereafter, N,N-dimethyl-4-aminopyridine and acetic anhydride were added, and the mixture was reacted with stirring for 1 hour. The reaction mixture was then precipitated with ion-exchanged water and acetone, followed by washing and drying to obtain an ethylene-vinyl acetate copolymer. The molar ratio (n) of ethylene units in the ethylene vinyl alcohol copolymer was calculated, based on a spectrum obtained by dissolving the obtained ethylene vinyl acetate copolymer in DMSO-$d_6$ and measuring it with a 400 MHz proton NMR measurement device at 256 times of integration, by using the intensity ratio of methine protons derived from ethylene units and vinyl acetate units (peaks from 1.1 to 1.9 ppm) to terminal methyl protons derived from vinyl acetate units (peak at 2.0 ppm). Here, since ethylene units are not affected by the acetalization reaction, the molar ratio (n) of ethylene units in the ethylene vinyl alcohol copolymer before the acetalization reaction is treated as equal to the molar ratio (n) of ethylene units in the modified vinyl acetal resin obtained after the acetalization reaction.

The molar ratio of vinyl alcohol units (l), the molar ratio of vinyl acetate units (m), and the molar ratio of acetalized vinyl alcohol units (k) with respect to all the monomer units constituting the modified vinyl acetal resin was calculated, based on a spectrum obtained by dissolving the modified vinyl acetal resin in DMSO-$d_6$ and measuring it with a 400 MHz proton NMR measurement device at 256 times of integration, by using the intensity ratio of methine protons derived from ethylene units, vinyl alcohol units and vinyl ester units (peaks from 1.0 to 1.8 ppm) to terminal methyl protons derived from acetal units (peaks from 0.8 to 1.0 ppm), and the molar ratio (n) of ethylene units in the ethylene vinyl alcohol copolymer.

The acetalization degree of the modified vinyl acetal resin was determined by acetalization degree (mol %)=$\{k/(k+l+m)\} \times 100$ using the molar ratio of vinyl alcohol units (l), the molar ratio of vinyl acetate units (m), and the molar ratio of acetalized vinyl alcohol units (k) determined above.

[MFR]

The melt flow rates of the ethylene vinyl alcohol copolymer before the acetalization reaction, the modified vinyl acetal resin, and a resin composition containing the modified vinyl acetal resin were measured according to JIS K 7210: 2014 under the conditions of 190° C. and the load of 2.16 kg.

[Self-Supporting Properties Under High Temperatures]

The melt-kneaded product of the resin composition obtained by the method described below was compression-molded at a pressure of 50 kgf/cm² for 5 minutes while being heated at 200° C. to obtain a sheet having a thickness of 0.8 mm. A test piece of 40 mm in length×5 mm in width was cut out from the sheet, and the storage elastic modulus (E') was measured under the conditions of a measurement temperature of 50° C. and a frequency of 1 Hz using a dynamic viscoelasticity measurement device manufactured by UBM Co., Ltd. The value served as an index for the self-supporting properties of the interlayer film for laminated glass under a high temperature environment.

[Penetration Resistance]

The melt-kneaded product of the resin composition obtained by the method described below was compression-molded at a pressure of 50 kgf/cm² for 5 minutes while being heated at 200° C. to obtain a sheet having a thickness of 0.8 mm. A test piece of 60 mm in length×60 mm in width was cut out from the sheet. Using a falling weight type impact tester (CEAST 9350 manufactured by Instron Co.), a test was conducted under the conditions of a measurement temperature of 23° C., a load of 2 kg, and a collision speed of 9 m/sec according to ASTM D3763. A penetration energy was calculated from the area of the SS curve at an instant when the tip of the striker came in contact with the test piece (sensed the test force) until it penetrated therethrough (the test force returned to zero) at the time of penetration through the test piece.

[Film-Forming Properties]

Using a 40 mm diameter full-flight single-screw extruder and a 60 cm wide coat hanger die, under the condition of a barrel temperature of 200° C., a resin composition obtained by the method described below was formed to produce a sheet having a thickness of 0.8 mm and a width of 50 cm. The film formation stability at this time was observed. When continuous film formation was possible without any problems and a sheet with good appearance was obtained, it was evaluated as A, whereas when problems such as breakage and loosening of the sheet occurred, and a sheet with good appearance was not obtained, it was evaluated as B.

[Glass Adhesiveness]

The melt-kneaded product of the resin composition obtained by the method described below was compression-molded at a pressure of 50 kgf/cm² for 5 minutes while being heated at 210° C. to obtain a sheet having a thickness of 0.8 mm. The obtained sheet was sandwiched between two pieces of float glass each with a thickness of 2.7 mm, the inside of the vacuum laminator was depressurized for 1 minute at 100° C. using a vacuum laminator (1522N manufactured by Nisshinbo Mechatronics Inc.), and it was pressed at 30 kPa for 5 minutes with the degree of decompression and temperature being maintained to give a temporarily bonded product. The obtained temporarily bonded product was put in an autoclave and treated at 140° C. and 1.2 MPa for 30 minutes to obtain a laminated glass. The obtained laminated glass was cut into a size of 25 mm×25 mm to obtain a test sample. The obtained test sample was evaluated by the compression shear strength test described in WO 1999/058334 A2. The maximum shearing stress when the laminated glass was peeled off was used as an index of glass adhesiveness.

[Transparency]

The laminated glass obtained by the above method was heated to 140° C. and then gradually cooled to 23° C. at a rate of 0.1° C./min. The haze of the laminated glass after the slow cooling operation was measured.

Example 1

(Synthesis of Modified Vinyl Acetal Resin)

100 parts by weight of chips of an ethylene vinyl alcohol copolymer having 44 mol % of ethylene units, a saponification degree of 99%, and an MFR of 5.5 g/10 min, synthesized according to the method described in JP 2016-28139 A, was dispersed in 315 parts by weight of 1-propanol. After the temperature of the solution was raised to 60° C. with stirring, 40 parts by weight of 1M hydrochloric acid was added, then 16.7 parts by weight of n-butyl aldehyde was added and dispersed. Thereafter, the acetalization reaction was carried out with the temperature being held at 60° C. As the reaction proceeded, the chips were dissolved to become a uniform solution. At the time when the reaction was kept for 36 Hours from the start, 6.4 parts by weight of sodium hydrogen carbonate was added to stop the reaction. To the reaction solution was added 500 parts by weight of 1-propanol to make it uniform, the mixture was then added dropwise to 2000 parts by weight of water to precipitate the resin. After that, the operations of filtration and washing with water was repeated 3 times, and vacuum drying was carried out at 60° C. for 8 hours to obtain a modified vinyl acetal resin. The amount of ethylene units of the obtained modified vinyl acetal resin was 47 mol %, and the acetalization degree was 20 mol %.

(Producing Modified Vinyl Acetal Resin Composition)

The modified vinyl acetal resin obtained above was melt-kneaded using a LABO PLASTMILL (device name "4M150", manufactured by Toyo Seiki Seisaku-sho, Ltd.) at a chamber temperature of 200° C. and a rotation speed of 100 rpm for 3 minutes. The contents of the chamber were taken out, and cooled to obtain a melt-kneaded product. Various physical properties were evaluated using the obtained melt-kneaded product. The results are shown in Table 1.

Examples 2 to 6

Respective modified vinyl acetal resins were obtained according to the same manner as in Example 1 except that the amount of ethylene units, MFR in the ethylene vinyl alcohol copolymer used, the addition amount of n-butyl aldehyde, and reaction time were changed as shown in Table They were melt-kneaded according to the same manner as in Example 1 to obtain melt-kneaded products. Various physical properties were evaluated using the obtained melt-kneaded products. The results are shown in Table 1.

Example 7

A melt-kneaded product was obtained according to the same manner as in Example 1 except that each modified vinyl acetal resin was obtained according to the same manner as in Example 2, and that 8 parts by weight of triethylene glycol-di-2-ethylhexanoate was added as a plasticizer to 100 parts by weight of the modified vinyl acetal resin. Various physical properties were evaluated using the obtained melt-kneaded product. The results are shown in Table 1.

TABLE 1

| | | Examples | | | | | | |
|---|---|---|---|---|---|---|---|---|
| | | 1 | 2 | 3 | 4 | 5 | 6 | 7 |
| Ethylene vinyl alcohol copolymer | Ethylene units (mol %) | 44 | 44 | 44 | 48 | 38 | 27 | 44 |
| | Vinyl alcohol units (mol %) | 56 | 56 | 56 | 52 | 62 | 73 | 56 |
| | MFR (g/10 min) | 5.5 | 5.5 | 1.7 | 6.4 | 1.7 | 1.6 | 5.5 |
| Reaction conditions | Ethylene vinyl alcohol copolymer (parts by weight) | 100 | 100 | 100 | 100 | 100 | 100 | 100 |
| | 1M Hydrochloric acid (parts by weight) | 40 | 40 | 40 | 40 | 40 | 40 | 40 |
| | n-Butyl aldehyde (parts by weight) | 16.7 | 11.9 | 18.9 | 6.5 | 20.3 | 15.4 | 12.4 |
| | Sodium carbonate (parts by weight) | 6.4 | 6.4 | 6.4 | 6.4 | 6.4 | 6.4 | 6.4 |
| | Reaction time (hours) | 36 | 45 | 36 | 36 | 36 | 36 | 40 |
| Modified vinyl acetal resin | Acetalization degree (mol %/PVA unit) | 31 | 22 | 35 | 13 | 34 | 22 | 23 |
| | Ethylene units (mol %) | 44 | 44 | 44 | 48 | 38 | 27 | 44 |
| | Vinyl alcohol units (mol %) | 39 | 44 | 36 | 45 | 41 | 57 | 43 |
| | Acetal units (mol %) | 17 | 12 | 20 | 7 | 21 | 16 | 13 |
| | MFR (g/10 min) | 10 | 8 | 4 | 6 | 3 | 27 | 8 |

TABLE 1-continued

|  |  | Examples | | | | | | |
| --- | --- | --- | --- | --- | --- | --- | --- | --- |
|  |  | 1 | 2 | 3 | 4 | 5 | 6 | 7 |
| Resin composition | Plasticizer (phr) | None | None | None | None | None | None | 8 |
|  | MFR (g/10 min) | 10 | 8 | 4 | 6 | 3 | 27 | 26 |
| Sheet shaped article | Penetration energy (J) | 15 | 16 | 15 | 16 | 13 | 11 | 16 |
|  | Storage elastic modulus (MPa) at 50° C. | 130 | 280 | 85 | 110 | 490 | 950 | 38 |
|  | Film forming properties | A | A | A | A | A | A | A |
| Laminated glass | Haze (%) | 1.2 | 1.5 | 1.2 | 1.1 | 1.8 | 1.6 | 1.5 |
|  | Maximum shearing stress (MPa/m$^2$) | 32 | 35 | 31 | 33 | 33 | 33 | 35 |

Comparative Examples 1 to 4

Respective modified vinyl acetal resins were obtained according to the same manner as in Example 1, except that the amount of ethylene units, MFR in the ethylene vinyl alcohol copolymer used, the addition amount of n-butyl aldehyde, and reaction time were changed as shown in Table 2. Melt-kneaded products were then obtained according to the same manner as in Example 1. Various physical properties were evaluated using the obtained melt-kneaded products. The results are shown in Table 2.

Comparative Example 5

1700 parts by weight of a 7.5% aqueous solution of a vinyl alcohol resin having a saponification degree of 99%, 74.6 parts by weight of butylaldehyde, and 0.13 parts by weight of 2,6-di-t-butyl-4-methylphenol were charged, and the whole was cooled to 14° C. To this was added 160.1 parts by weight of hydrochloric acid having a concentration of 20% by mass, and the acetalization reaction was started. In ten minutes after the addition of hydrochloric acid was finished, the temperature was raised to 65° C. over 90 minutes, and the reaction was further carried out for 120 minutes. This was then cooled to room temperature. The precipitated resin was filtered, and washed with ion-exchanged water (10 times with 10 times in volume to the resin of ion-exchanged water). Then, it was sufficiently neutralized with a 0.3% sodium hydroxide solution, washed 10 times with 10 times in volume to the resin of ion-exchanged water, dehydrated, and dried to obtain a vinyl butyral resin.

The vinyl butyral resin obtained above was melt-kneaded according to the same manner as in Example 1 to obtain a melt-kneaded product. Various physical properties were evaluated using the obtained melt-kneaded product. The results are shown in Table 2.

Comparative Example 6

A melt-kneaded product was obtained according to the same manner as in Comparative Example 7 except that a vinyl butyral resin was obtained according to the same manner as in Comparative Example 5, and that 30 parts by weight of triethylene glycol-di-2-ethylhexanoate was added as a plasticizer to 100 parts by weight of the vinyl butyral resin. Various physical properties were evaluated using the obtained melt-kneaded product. The results are shown in Table 2.

Comparative Example 7

According to the method described in Example 1 of Patent Document 3 (JP 2011-57737 A), 100 g of polyvinyl alcohol having an ethylene content of 15 mol %, a saponification degree of 98 mol %, and an average polymerization degree of 1700 was stirred in 900 g of distilled water. However, the polyvinyl alcohol was not dissolved, and an aqueous polyvinyl alcohol solution having a concentration of 10% by weight was not obtained. The acetalization reaction was not be able to carry out.

Comparative Example 8

A modified vinyl acetal resin was obtained according to the method as in Example 1 of the specification of the present with the reaction conditions such as using 1-propanol as a solvent, except that the polyvinyl alcohol having an ethylene content of 15 mol %, a saponification degree of 98 mol %, and an average degree of polymerization of 1700, and the addition amount of n-butyraldehyde, which are described in Example 1 of Patent Document 3. The obtained modified vinyl acetal resin had a acetalization degree of 73 mol %, which was inconsistent with the acetalization degree of 64.5 mol % described in Patent Document 3. On the other hand, the obtained modified vinyl acetal resin had 62 mol % of acetal units, which was close to the acetalization degree of 64.5 mol % described in Patent Document 3.

It is found from this that the acetalization degree in Patent Document 3 represents the above acetal units, that is, the ratio of acetalized vinyl alcohol with respect to all the monomer units. Thus, the acetalization degree used in Patent Document 3 is different in definition from the acetalization degree in the present invention.

Then, a melt-kneaded product was obtained according to the same manner as in Example 1 of Patent Document 3. Various physical properties were evaluated using the obtained melt-kneaded product. The results are shown in Table 2.

TABLE 2

| | | Comparative Examples | | | | | | |
|---|---|---|---|---|---|---|---|---|
| | | 1 | 2 | 3 | 4 | 5 | 6 | 8 |
| Ethylene vinyl alcohol copolymer | Ethylene units (mol %) | 15 | 38 | 40 | 44 | 0 | 0 | 15 |
| | Vinyl alcohol units (mol %) | 85 | 62 | 60 | 56 | 100 | 100 | 85 |
| | MFR (g/10 min) | 1.5 | 1.7 | 3.2 | 5.5 | — | — | 1.5 |
| Reaction conditions | Ethylene vinyl alcohol copolymer (parts by weight) | 100 | 100 | 100 | 100 | — | — | 100 |
| | 1M Hydrochloric acid (parts by weight) | 40 | 40 | 40 | 40 | — | — | 40 |
| | n-Butyl aldehyde (parts by weight) | 62.1 | 32.8 | 2.3 | 37.7 | — | — | 60.0 |
| | Sodium carbonate (parts by weight) | 6.4 | 6.4 | 6.4 | 6.4 | — | — | 6.4 |
| | Reaction time (hours) | 8 | 14 | 45 | 8 | — | — | 8 |
| Modified vinyl acetal resin | Acetalization degree (mol %/PVA unit) | 76 | 55 | 4 | 70 | 72 | 72 | 73 |
| | Ethylene units (mol %) | 15 | 38 | 40 | 44 | 0 | 0 | 15 |
| | Vinyl alcohol units (mol %) | 20 | 28 | 58 | 17 | 28 | 28 | 23 |
| | Acetal units (mol %) | 65 | 34 | 2 | 39 | 72 | 72 | 62 |
| | MFR (g/10 min) | 45 | 23 | 15 | 51 | 0.6 | 0.6 | 45 |
| Resin composition | Plasticizer (phr) | None | None | None | None | None | 30 | None |
| | MFR (g/10 min) | 45 | 23 | 15 | 51 | 0.6 | 15 | 42 |
| Sheet shaped article | Penetration energy (J) | 8 | 10 | 15 | 16 | 14 | 15 | 8 |
| | Storage elastic modulus (MPa) at 50° C. | 26 | 30 | 890 | 5 | 1,800 | 4 | 28 |
| | Film forming properties | A | A | A | A | B | A | A |
| Laminated glass | Haze (%) | 1.2 | 1.4 | 8.5 | 1.1 | 1.2 | 1.2 | 1.5 |
| | Maximum shearing stress (MPa/m$^2$) | 19 | 21 | 29 | 17 | 25 | 26 | 19 |

The invention claimed is:

1. A laminated glass, comprising:
   two glass plates and
   an interlayer film arranged between the two glass plates wherein the sheet shaped article has
   wherein
   the interlayer film comprises a sheet shaped article containing a resin composition, which comprises 80% by mass or more of a modified vinyl acetal resin;
   the modified vinyl acetal resin contains 27 to 48 mol % of ethylene units, 36 to 57 mol % of vinyl alcohol units, and 16 to 28 mol % of acetalized vinyl alcohol units, based on all monomer units constituting the modified vinyl acetal resin;
   the modified vinyl acetal resin is produced through an acetalization reaction of an aldehyde with an ethylene vinyl alcohol copolymer;
   the aldehyde is only one or more aldehydes selected from the group consisting of formaldehyde, acetaldehyde, propionaldehyde, butylaldehyde, hexylaldehyde, benzaldehyde ($C_6H_5CHO$), isobutylaldehyde, 2-ethylhexylaldehyde, 2-methylbutylaldehyde, trimethylacetaldehyde, 2-methylpentylaldehyde, 2,2-dimethylbutylaldehyde, 2-ethylbutylaldehyde, and 3,5,5-trimethylhexylaldehyde; and the modified vinyl acetal resin has an acetalization degree of 5 mol % or more and less than 40 mol %, where the acetalization degree is defined as a ratio of the acetalized vinyl alcohol units out of all the monomer units other than the ethylene units.

2. The laminated glass according to claim 1, wherein the acetalization degree of the modified vinyl acetal resin is 10 mol % or more and 36 mol % or less.

3. The laminated glass according to claim 1, wherein the modified vinyl acetal resin contains the vinyl alcohol units in an amount of 38 mol % or more and 57 mol % or less.

4. The laminated glass according to claim 1, wherein the sheet shaped article has a thickness of 0.10 to 3 mm.

5. The laminated glass according to claim 1, wherein the sheet shaped article has
   wherein
   the interlayer film comprises a sheet shaped article containing a resin composition, which comprises 80% by mass or more of a modified vinyl acetal resin;
   the modified vinyl acetal resin contains 27 to 48 mol % of ethylene units, 36 to 57 mol % of vinyl alcohol units, and 16 to 28 mol % of acetalized vinyl alcohol units, based on all monomer units constituting the modified vinyl acetal resin;
   the modified vinyl acetal resin is produced through an acetalization reaction of an aldehyde with an ethylene vinyl alcohol copolymer;
   the aldehyde is only one or more aldehydes selected from the group consisting of formaldehyde, acetaldehyde, propionaldehyde, butylaldehyde, hexylaldehyde, benzaldehyde ($C_6H_5CHO$), isobutylaldehyde, 2-ethylhexylaldehyde, 2-methylbutylaldehyde, trimethylacetaldehyde, 2-methylpentylaldehyde, 2,2-dimethylbutylaldehyde, 2-ethylbutylaldehyde, and 3,5,5-trimethylhexylaldehyde; and the modified vinyl acetal resin has an acetalization degree of 5 mol % or more and less than 40 mol %, where the acetalization degree is defined as a ratio of the acetalized vinyl alcohol units out of all the monomer units other than the ethylene units a storage elastic modulus E' at a temperature of 50° C. and a frequency of 1 Hz of 20 to 1,000 MPa.

6. The laminated glass according to claim 1, wherein the resin composition further comprises 1% by mass or less of a plasticizer.

* * * * *